United States Patent [19]

Okuda et al.

[11] Patent Number: 4,939,377

[45] Date of Patent: Jul. 3, 1990

[54] OPTICAL APPARATUS FOR DETECTING DOCUMENT SIZE FOR USE IN A COPYING APPARATUS

[75] Inventors: Masakiyo Okuda, Kashiwara; Toshihisa Matsuo, Yamatokooriyama, both of Japan

[73] Assignee: Sharp Kabushiki Kaisha, Osaka, Japan

[21] Appl. No.: 241,953

[22] Filed: Sep. 8, 1988

[30] Foreign Application Priority Data

| | | | |
|---|---|---|---|
| Sep. 8, 1987 | [JP] | Japan | 62-224863 |
| Nov. 26, 1987 | [JP] | Japan | 62-298462 |
| Dec. 21, 1987 | [JP] | Japan | 62-194324 |

[51] Int. Cl.[5] .......... G01N 21/86

[52] U.S. Cl. .......... 250/560; 356/383

[58] Field of Search .......... 250/221, 222.1, 560, 250/561, 571, 557; 356/379, 383, 384; 355/41, 61, 75

[56] References Cited

U.S. PATENT DOCUMENTS

| | | | |
|---|---|---|---|
| 4,511,246 | 4/1985 | Nishiyama | 355/75 |
| 4,571,498 | 2/1986 | Hagan et al. | 250/560 |
| 4,614,874 | 9/1986 | Fukuda et al. | 250/560 |
| 4,641,966 | 2/1987 | Lemmers et al. | 250/560 |

*Primary Examiner*—David C. Nelms

[57] ABSTRACT

In an original document size detecting arrangement, one or more pairs of a light emitting element and a light receiving element are located on both sides of the original document platform so that the detection light emitted from the light emitting element travels to the light receiving element along the top surface of the original document platform spaced therefrom a predetermined value. Since the detection light travels along the surface of the original document platform, when an original document is placed on the platform, the detection light is interrupted by the original document. A detecting element is provided for detecting whether the detection light enters into the light receiving element or whether the detection light is interrupted so that the detecting element can generate a detection signal showing the size of the original document.

12 Claims, 10 Drawing Sheets

OPTICAL APPARATUS FOR DETECTING DOCUMENT SIZE FOR USE IN A COPYING APPARATUS

BACKGROUND OF THE INVENTION

1. Field of the Invention

The present invention relates to an original size detecting arrangement and more particularly, to an arrangement for optically detecting sizes of original document for example, in a copying apparatus or the like.

2. Description of the Prior Art

In a copy apparatus having a plurality of paper feeding cassettes, there is provided an original size detecting apparatus for automatically selecting a coyping paper size from various paper sizes corresponding to the size of an original document placed on an original platform of the copying machine.

Conventionally, in general, original size detecting appratuses frequently are of a photo interrupter type wherein the size of the original document is detected by projecting light towards a transparent glass plate which serves as an original document platform form below. It is thereafter detected whether the light projected toward the glass plate is reflected by an original document placed on the glass plate or, after the light reaches an original document cover or a light detecting reflection plate in absence of an original document on the glass plate, is reflected therefrom.

In the conventional original size detection arrangement, it is difficult to accurately discriminate from which part the light is reflected since a stain on the original document cover or reflection plate may effect the reflection of light. In addition, since the light must pass through the glass plate of the original document platform twice, the light tends to be attenuated by the reflections at both surfaces of the glass plate. In particular, in such an arrangement wherein the light is projected toward the glass plate from an inclined direction, the light attenuation is serious, whereby the S/N ratio of a detection signal is lowered.

Accordingly, the conventional original size detecting arrangment inaccurately detects original document size.

SUMMARY OF THE INVENTION

The present invention is designed to eliminate the problems mentioned above and the essential object is to provide an original document size detecting arrangement in which the problem of light attentuation can be effectively solved.

Another object of the present invention is to provide an original document size detecting arrangement which can generate a size detection signal of a high S/N ratio.

A further object of the present invention is to provide an original document size detecting arrangement which can detect the size of the various kinds of original document.

In an original document detecting arrangement according to the present invention, one or more pairs of a light emitting element and a light receiving element are located on both sides of an original document platform so that the light emitted from the light emitting element travels to the light receiving element along the top surface of the original document platform spaced therefrom by a predetermined value. During such time when no original document is placed on the original document platform, the light receiving element receives the light from the light emitting element. On the other hand, when an original document is placed on the platform, the light is interrupted by the original document. Detecting means is provided for detecting whether the light enters the light receiving element or whether the light is interrupted so that the detection means generates a detection signal indicating the size of the original document.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 6(*b*) is a cross sectional view of FIG. 6(*a*);

DETAILED DESCRIPTION OF THE PREFERRED EMBODIMENTS

Figure 1:
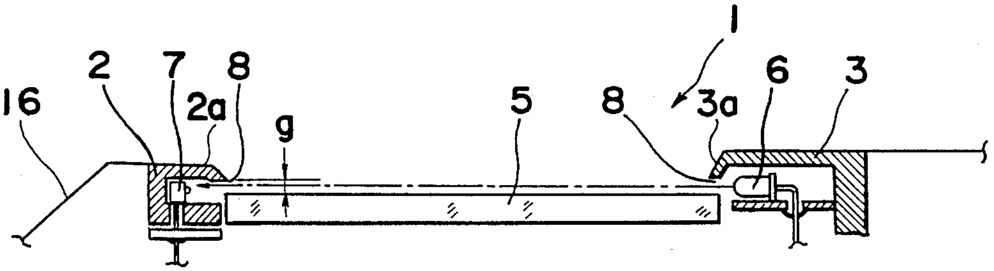
FIG. 1 is a cross sectional view showing an essential portion of an embodiment of an original document size detecting arrangement according to the present invention.

Before the description proceeds, it is noted that the present invention is explained with reference to examples of original document size arrangements for detecting four kinds of original document sizes of B5, A4, B4 and A3 in order to select copying papers automatically in a copying machine. Also it is noted that like parts are designated by like reference numerals throughout the drawings.

Figure 2:
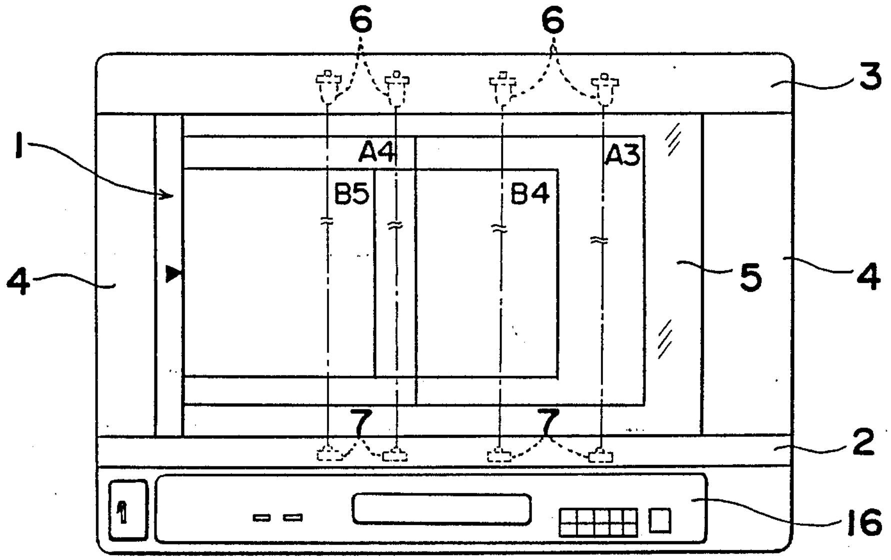
FIG. 2 is top plan view of FIG. 1.

As shown in FIGS. 1 and 2, an original platform 1 of a generally rectangular shape provided on the top portion of a copying machine (not shown) is formed by a table glass 5 having its peripheral edges framed by a front frame 2, a rear frame 3 and both side frames 4. The table glass 5 is made of a transparent and flat glass plate. An operation panel 16 of the copying machine is disposed adjacent to the front portion of the front frame 2. One of the side frames 4 acts as the standard for placing the original document. That is, whenever the original document is placed on the original platform, one edge of the original document is aligned with the inner edge of said one side frame.

Four light emitting elements 6 are installed inside of the rear frame 3. Inside the front frame 2 are disposed four light receiving elements 7. Each of the light emitting elements 6 is an infra red light emitting diode and each of the light receiving elements 7 is made of a photo diode. The respective light emitting elements 6 and the light receiving elements 7 are disposed at positions as shown in FIG. 2 so as to oppose each other forming a plurality of pairs of the light emitting element 6 and light receiving element 7. As shown in FIG. 2, the light emitting elements 6 and the light receiving elements 7 are so disposed that each light beam emitted from each light emitting element 6 travels in a direction parallel to the inner edge of the said one side frame which acts as the standard for placing the original document.

As shown in FIG. 1., in the rear frame 3, there is defined a gap 8 between the table glass 5 and the lower end of an inner wall 3*a* of the rear frame 3 at the position facing the head portion of each of the light emitting elements 6. Similarly, in the front frame 2, there is defined another gap 8 between the table glass 5 and the lower end of an inner wall 2*a* of the front frame 2 at the position facing the head portion of each of the light receiving elements 7. In this arrangement, the light from the light emitting element 6 (referred to as detecting light hereinafter) passes through the gap 8 of the rear frame 3, progressing above and along the top surface of the table glass 5, and turn enters in the gap 8 of the front frame 2 to be received by the light receiving element 7. In the embodiment, the size g of the gap 8 is 0.5 mm, whereby the light axis (shown by a phantom line) of the light emitting element 6 passes at a level spaced 0.25 mm above the table glass 5.

The respective pairs of the light emitting elements 6 and light receiving elements 7 are so disposed that the light axis of a first pair of the light emitting element 6 and light receiving element 7 is interrupted by any sizes of an original document greater than B5 size. The light axis of a second pair of the light emitting element and light receiving element is interrupted by any sizes of the original document greater than A4 size, the light axis of a third pair is interrupted by any sizes of an original document greater than B4 size and the light axis of a fourth pair is interrupted by only an original document of A3 size.

Figure 3:
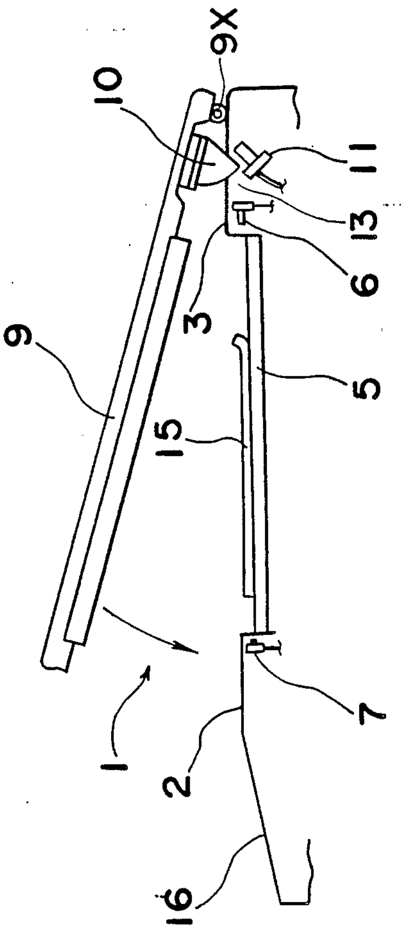
FIG. 3 is a side view of FIG. 1.

There is provided on the original document platform 1 an original document cover 9 as shown in FIG. 3. The original document cover 9 has its rear edge portion pivotally hinged around an axis 9*x* on the rear frame 3 and when the original document cover 9 is closed by moving the front edge portion of the original document cover 9 downwardly, the original document platform 1 can be covered by the cover 9. A projection 10 is projected downwardly from the rear side of the lower surface of the original document cover 9. An opening 13 is defined in the rear frame 3 corresponding to the projection 10. A switch 11 is disposed inside the rear frame 3 near the opening 13. The switch 11 is so mounted that when the original document cover 9 is closed, specifically when the original document cover 9 is slanted by about 30° against the table glass 5, an operating lever (not shown) is depressed by the projection 10, whereby the switch 11 is turned on.

Figure 4:
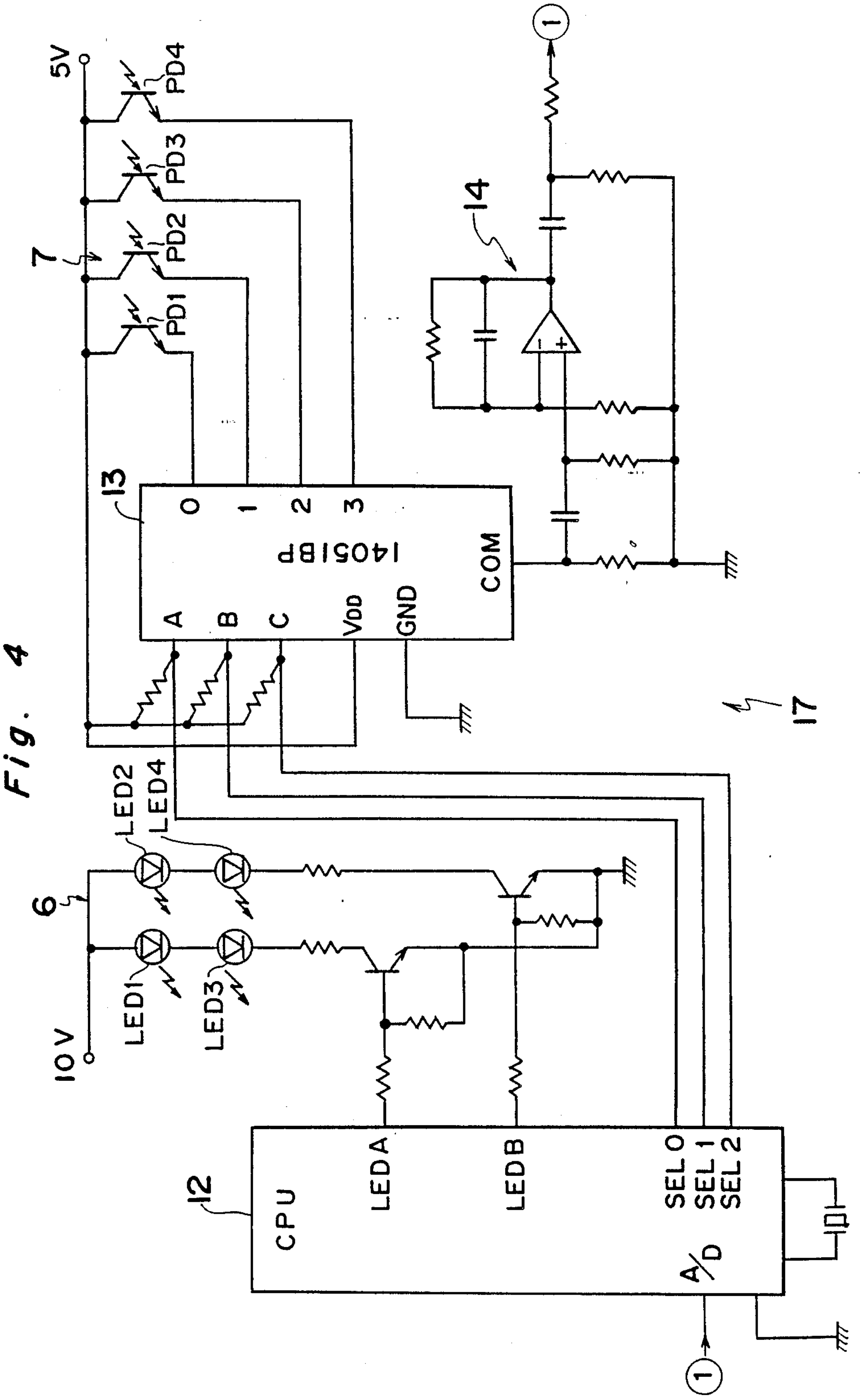
FIG. 4 is an electrical circuit diagram showing a control circuit for use in the original document size detecting arrangment according to the present invention.

Each of LEDs of the light emitting elements 6 is driven to emit light by a microcomputer 12 as shown in FIG. 4. The light emission of the light emitting elements 6 is performed in such a manner that LED 1 and LED 3 of the first pair and third pairs, that is the odd number pairs of the light emitting elements 6, are driven by a drive signal from the LED-A port of the microcomputer 12 and LED 2 and LED 4 of the second pair, and fourth pair that is the even number of pairs of the light emitting elements 6, are driven by the signal from LED-B port of the microcomputer 12. The microcomputer 12 generates the drive signals from the ports LED-A and LED-B alternately so as to avoid that any one of the light receiving elements 7 erroneously senses the light beam emitted from the light emitting element which belongs to the adjacent pair. The detection signals of the photo diodes of the light receiving elements 7 are inputted to input terminals 0 to 3 of an analog switch 13 and the detection signals are output from the COM terminal. The analog switch 13 acts to selectively connect any one of the photo diodes PD1, PD2, PD3 and PD4 to the terminal COM corresponding to the binary signals fed from the ports SEL0 to SEL2 of the microcomputer 12. The terminal COM of the analog switch 13 is connected to the A/D port of the microcomputer 12 through an amplifier 14. By the arrangement of outputting the detection signals of the photo diodes PD1 and PD4 from one terminal of the analog switch 13, the detection signals can be amplified by only one amplifier 14.

The microcomputer 12 compares the detection signals entered to the A/D terminal with a predetermined value and changes them into binary value signals and judges the original document size by the combination of the binary signals.

The operation of the original document size detecting arrangement mentioned above will be hereinafter explained.

As shown in FIG. 3, when the original document 15 is placed on the original platform 15 and the original document cover 9 is closed, the switch 11 is turned on when the projection 10 engages with the switch 11. The microcomputer 12 generates the drive signals from both ports LED-A and LED-B alternately, thereby alternately causing the resepctive LEDs of the odd numbered pairs and even numbered pairs of the light emitting elements 6 to be illuminated. Simultaneously, the micorcomputer 12 generates the binary signals sequentially from the ports SEL0 to SEL2 to switch the analog switch 13. Accordingly, the detection signals from PD1 to PD4 of the resepctive light receiving elements 7 are input to the A/D port of the microcomputer 12 serially and, in the microcomputer 12, the original document size is detected in response to the signals fed from PD1 to PD4. The process is continued until the original document cover 9 is fully closed.

The procedures for detecting the original document size is listed in the table below. It is noted that in the table, character H represents the output of the photo diode which receives the detection light from an LED and character L represents that the detection light is interrupted by the original document 15.

| | B5 | A4 | B4 | A3 |
|---|---|---|---|---|
| PD1 | L | L | L | L |
| PD2 | H | L | L | L |
| PD3 | H | H | L | L |
| PD4 | H | H | H | L |

When the output of the photo diode PD1 becomes H, this means that the original document cover 9 is closed without the original document 15 placed on the original document platform 1. In this case there may be generated an alarm so as to prevent erroneous copy.

Figure 5:
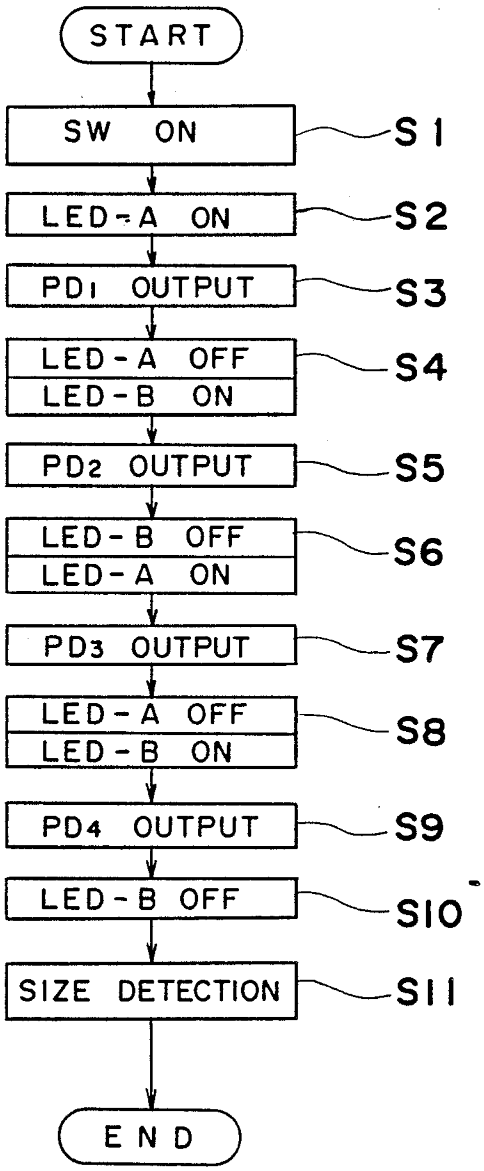
FIG. 5 is a flow chart showing the operation of the original document size detection arrangement according to the present invention.

The operations of generation of the signals from the ports LED-A and LED-B and the ports SEL0 to SEL2 so as to control the light emitting elements 6 and light receiving elements 7 are explained with reference to the flow chart shown in FIG. 5.

In the step S1, when the original document cover 9 is closed and the switch 11 is turned on, the drive signal is generated from the port LED-A, activating the odd numbered pairs of LED1 and LED3 in the step S2. Then the first binary signals are generated from the ports SEL0 to SEL2 to select the output (0) of the analog switch 13 for receiving the detection signal of the photo diode PD1 in the step S3. Subsequently the port LED-A is turned off with the port LED-B turned on, causing the even numbered pairs of LED2 and LED4 to be driven to emit the light in the step S4 and, in turn in the step S5, the second binary signals are generated from the ports SEL0 to SEL2 to select the photo diode PD2 by the analogue switch 13. Moreover in the step S6, the port LED-B is turned off, turning on the port LED-A again, causing the odd numbered pairs of LED1 and LED3 to be driven to emit the light. The third binary signals are generated from the ports SEL0 to SEL2 to select the photo diode PD3 by the analogue switch 13 in the step S7. Thereafter the port LED-A is turned off, turning on the port LED-B to emit the light from the even numbered pairs of LED2 and LED4 in the step S8. Again the binary signals are generated from the ports SEL0 to SEL2 so that the analogue switch 13 selects the signal of the photo diode PD4 in the step S9. When the output of the photo diode PD4 is taken in the microcomputer, the port LED-B is turned off in the step S10, and the microcomputer 12 judges the size of the original document in response to the detection signals fed from the photo diodes PD1 to PD4 in the step S11. Thus the process is completed.

In the embodiment mentioned above, when the original document cover 9 is not used, it is possible to maintain the original document size detection device always in an operable condition. This feature is advantageous for eliminating an undesired trace of the frame according to the original document size.

Figure 6:
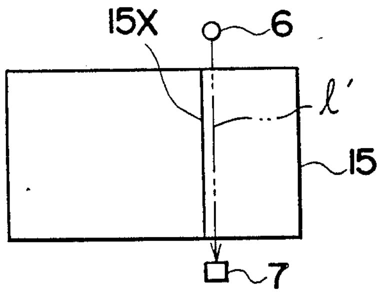
FIG. 6(*a*) is a top plan view showing an operation of the arrangement when an original document is folded upward.
Figure 6:
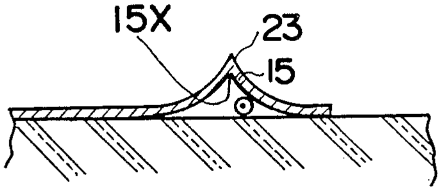

In the arrangement mentioned above, in a case where the original document 15 is a book or a sheet which is folded as shown in 15X by FIGS. 6(*a*) and 6(*b*), the fold tends to be raised upwardly as shown by 23, the light axis l' directed from the light emitting element 6 to the light receiving element 7 passes through the inside of the raised portion of the fold 23. It may thus be judged that the original document 15 is absent despite that it is actually present, whereby there occurs an error in detecting the original document size. This error can be eliminated by the embodiment mentioned below.

Figure 7:
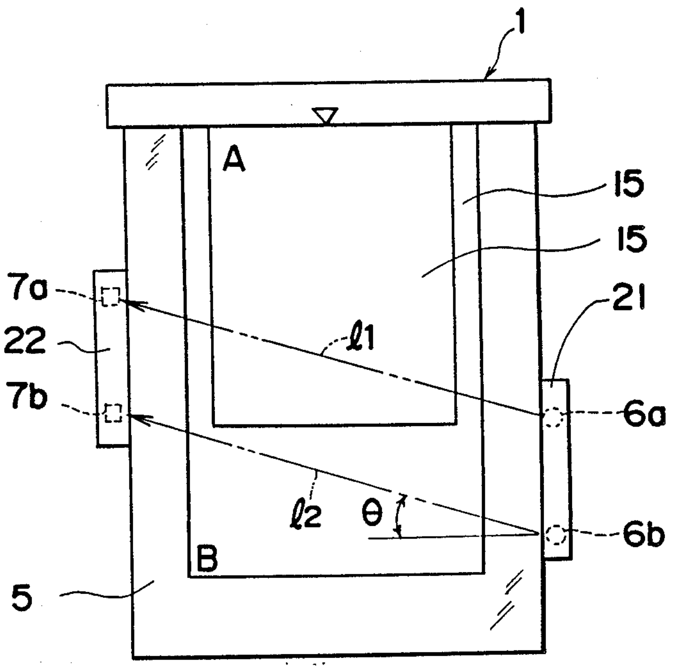
FIG. 7 is a top plan view showing another embodiment of the original document size detecting arrangement according to the present invention.
Figure 8:
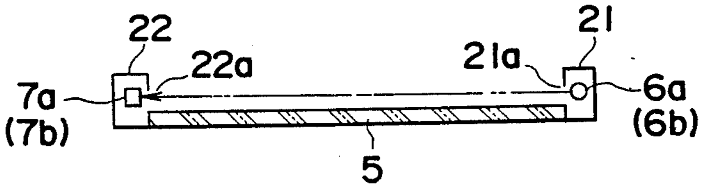
FIG. 8 is a cross sectional view of FIG. 7.

As shown in FIGS. 7 and 8, on the upper portion of the copying machine there is provided table glass 5 on which the original document 15 can be placed positioned at the intermediate position in terms of the width direction. A holder 21 is attached to the one side of the table glass 5 and another holder 22 is attached to the other side of the table glass 5 in such a manner that said another holder 22 is shifted toward the front side with respect to the holder 21. Slits 21*a* and 22*a* are defined on the holders 21 and 22 respectively opposing each other.

In the holders 21 and 22, two light emitting elements 6*a* and 6*b* and light receiving elements 7*a* and 7*b* are opposed through the slits 21*a* and 22*a*, so that a light axis l1 from the light emitting element 6*a* to the light receiving element 7*a* is formed and light axis l2, parallel to the axis l1, from the light emitting element 6*b* to the light receiving element 7*b* is formed. The light emitting elements and light receiving elements are so arranged that the light emitted from the light emitting element 6*a* can not be received by the light receiving element 7*b* and the light emitted from the light emitting element 6*b* can not be received by the light receiving element 7*a*.

The light emitting elements 6*a* and 6*b* and the light receiving elements 7*a* and 7*b* are also so arranged that the light axes l1 and l2 are slanted by angle $\eta$ against the width direction of the original document as shown in FIG. 7 or the longitudinal direction of the inner edge of one of the side frames acting as the standard for placing the original document. The light axes l1 and l2 travel at a level of 0.5 to 1 mm spaced above the top surface of the table glass. The angle $\theta$ is as large as possible. The light axis l1 can be interrupted by the original document 15 fo the sizes A and B. In the other hand, the light axis l2 can be interrupted only by the original document of size B. As the light emitting elements 6*a* and 6*b*, a light emitting diode is used and as the light receiving elements 7*a* and 7*b*, a photo transistor is used.

In the arrangement mentioned above, when the original document 15 is placed on the table glass 5, the light emitting elements 6*a* and 6*b* emit light alternately. If only the light axis l1 travelling from the light emitting element 6*a* to the light receiving element 7*a* is interrupted by the original document 15, it is detected that the size of the original document is the size A. If the light axis l1 and the light axis l2 from the light emitting element 6*b* to the light receiving element 7*b* are both interrupted by the original document 15, it is detected that the size of the original document is the size B. Since the light emitting elements 6*a* and 6*b* emit the detection light alternately, even if the light from the light emitting element 6*a* is erroneously received by the light receiving element 7*b*, it is judged by the timing of reception that the received light is not the light from the light emitting element 6*b*, whereby it is possible to prevent incorrect detection of the original document size.

Figure 9:
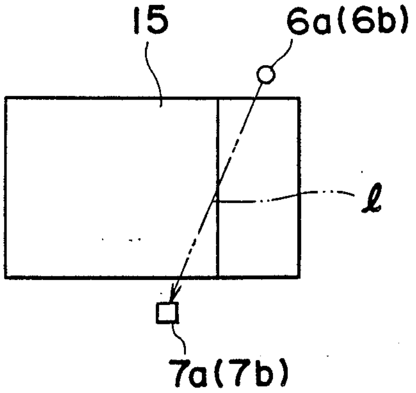
FIG. 9 is a top plan view showing an operation of the example shown in FIG. 7.
Figure 10:
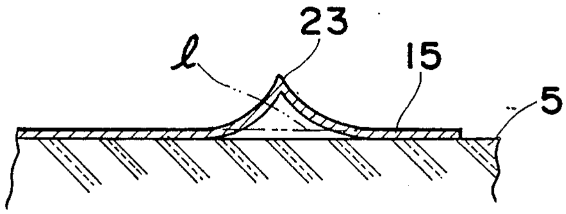
FIG. 10 is a cross sectional view of FIG. 9.

Since the light axes l1 and l2 are slanted against the original document 15 on the table glass 5, even if the original document 15 is folded upwardly as shown by reference numeral 23 in FIGS. 9 and 10, the light axes l1 or l2 can pass through not only the folded part 23, but also a part of the original document 15 laid directly on the table glass 5 so long as the light axis l travels across the original document 15, whereby the light axis l1 or l2 are interrupted by the original document 15. Therefore, it is possible to detect interruption of the light axis correctly even if the original document is folded.

In embodying the present invention, the number of the light emitting elements 6a and 6b and the light receiving elements 7a and 7b may be changed as desired corresponding to the number of kinds of the original document size. Also, there may be standard positions for setting the original document as desired.

By the arrangement mentioned above, since the light axis directed from the light emitting element to the light receiving element is slanted against the setting direction of the original document, even if a part of the original document is raised upwardly from the table glass, the light axis passes not only the raised part but a part of the original document laid on the table glass. The light axis can be interrupted by the original document as long as the original document is present on the table glass, in order to assure detection of the size of the original document.

Figure 13:
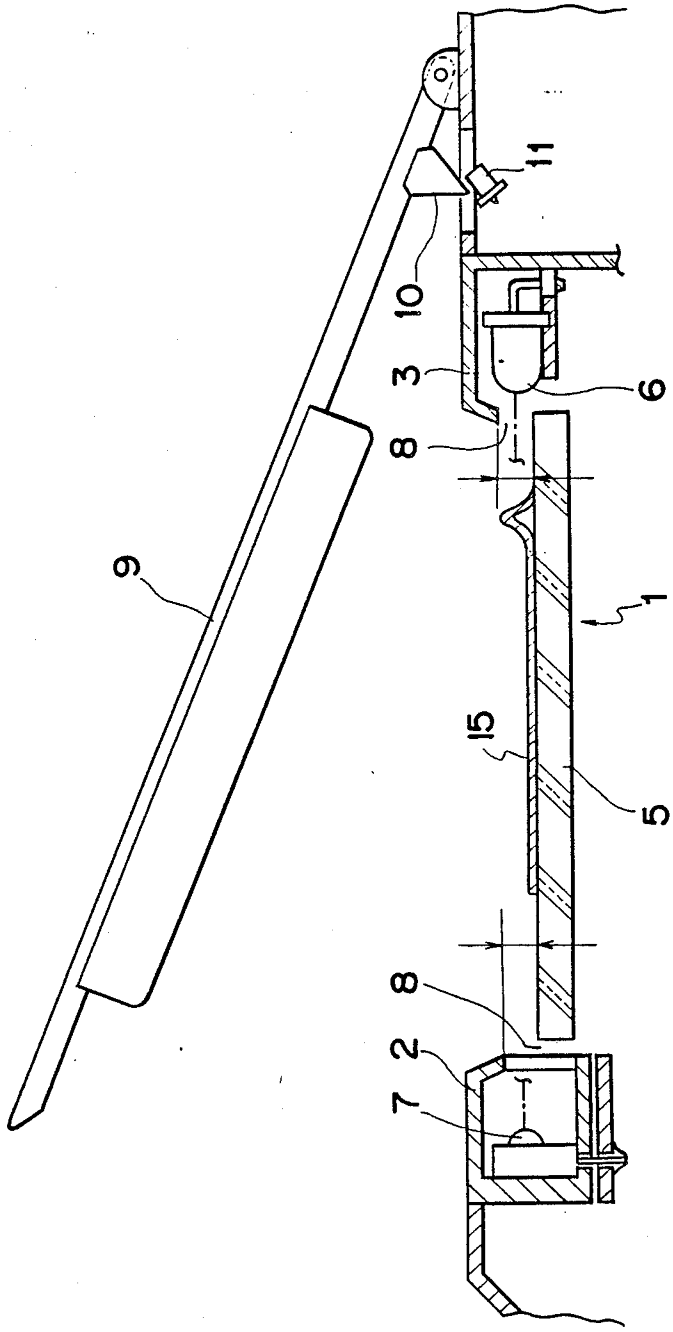
FIG. 13 is a side view showing details of the original document size detection arrangement in which the positioning mechanism for the light emitting diode and photo transistor is employed.

The light emitting diode 6 and the photo transistor 7 forming the size detecting arrangement are opposed to each other on both sides fo the original platform as already mentioned. In regard to the details of the original platform, as shown in FIG. 13, the original document cover 9 is rotatably disposed so as to cover the top surface of the original platform. There is provided the projection 10 near the hinge portion fo the original document cover 9. Inside the copying machine 1, there is provided the start switch 11 which is operated by the projections 10 when the original document cover 9 is rotated about 30°.

As mentioned above, the operation of the detection of the original document size is started by the signal of the switch 11. However, there may occur a case such that copying is performed with the original document uncovered by the original document cover 9. In such a case, a further switch (not shown) may be provided so that the control circuit 17 shown in FIG. 4 can be operated by turing on the further switch without the switch 11 operated.

There are formed slits 8 in the front portions of the light emitting element 6 and the light receiving element 7 between the table glass 5 and the lower edge of the frames 2 and 3 with the gap of 0.5 mm spaced so that the light emitted from the light emitting element 6 enters the light receiving element 7 through the slit 8. The light emitting element 6 and light receiving element 7 are so arranged that the light axis passes at a level 0.25 mm spaced above the table glass 5. On the other hand, since the original document 15 placed on the table glass 5 is not perfectly flat and the level of the highest part of the original document is spaced more than 0.5 mm above the table glass 5, as long as the original document is wider than 100 mm even if a sheet of the original document is thin, the light axis can be interrupt when the original document is placed on the table glass 5.

Figure 11:
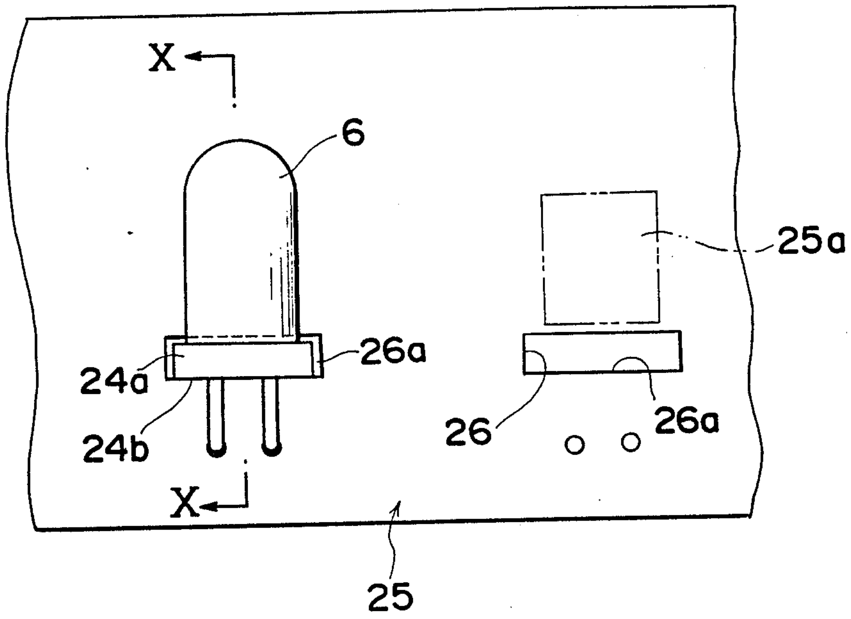
FIG. 11 is a partial top plan view showing an example of a positioning mechanism for positioning a light emitting diode used in the respective embodiments.
Figure 12:
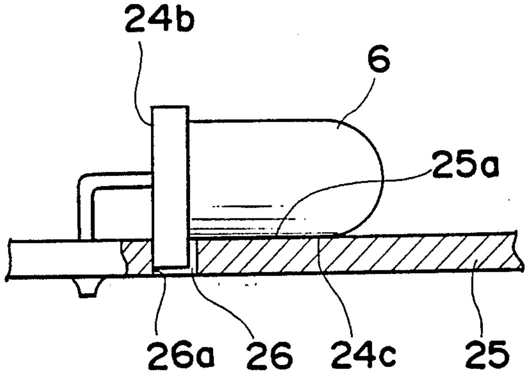
FIG. 12 is a cross sectional view taken along lines X—X of FIG. 11.

An example of a positioning mechanism for positioning the light emitting element 6 and the light receiving element 7 for aligning the light axis between them is explained hereinafter with reference to FIGS. 11 to 13.

As shown in the drawings, a flange 24a is formed at the rear portion of an outer casing of the light emitting element 6, or light emitting diode, which is made of a plastic resin molding and a first standard surface 24b serving as a standard surface of the element is formed at the rear surface of the outer casing. Moreover, a seconde standard surface 24c is formed at the bottom surface of the outer casing. On the other hand, a cut portion 26 is formed on a substrate 25 which is positioned below the light emitting element 6. The cut portion 26a has a third standard surface 26a serving as a standard surface of the substrate corresponding to the first standard surface 24b and as the standard surface of the substrate, a fourth standard surface 25a is formed on the substrate 25 corresponding to the second standard surface 24c. The light emitting element 6 is so secured to the substrate that the respective standard surfaces 24b and 26a and 24c and 25a are contacted, whereby the direction of the light emitting element 6 can be surely defined with high precision by the contact between the first standard surface 24b and the third standard surface 26a. The level of the light emitting element 6 can be easily and surely defined by the contact between the second standard surface 24c and the fourth standard surface 25a with precision. In the arrangement mentioned above, by forming the third standard surface 26a corresponding to the light receiving element 7 and by forming the fourth standard 25a corresponding to the original document platform 5, the light emitting element 6 can be positioned easily with the direction and level of the light emitting element 6 and the light receiving element 7 correctly aligned so that the light axis between the light emitting element 6 and the light receiving element 7 by only mounting the light emitting element 6 to the substrate 25. Therefore, it is possible to decrease the work for mounting the light emitting element to the device and the work for adjustment and to increase the reliability of the device.

Figure 14:
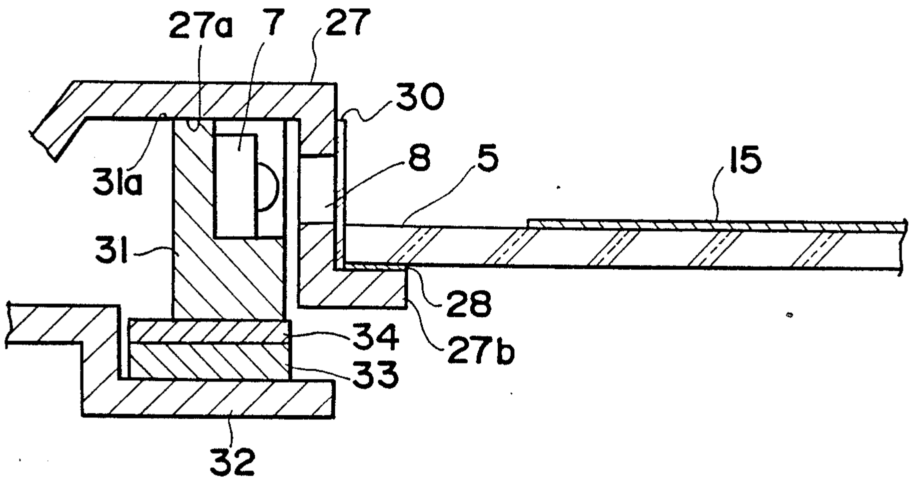
FIG. 14 is a cross sectional view showing an essential portion of the positioning mechanism for the photo transistor.
Figure 15:
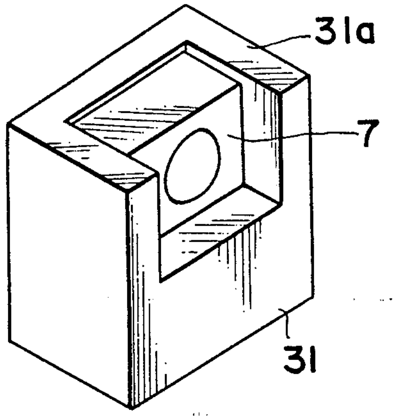
FIG. 15 is a perspective view showing an example of the positioning mechanism in which a standard suface of the element is formed by a block.

Another example of the positioning mechanism is explained with reference to FIGS. 14 to 16. As shown in FIG. 14, the light receiving element 7 or the photo transistor is held in the casing 31 of a rectangular shape which is placed on a substrate 34 situated on a supporting plate 32 through a resilient plate 33 made of rubber material. On the upper surface fo the casing 31, a fifth standard surface 31a is formed as one of the element side standard surface, while a sixth standard surface 27a is formed on a supporting plate 27 disposed on the casing 31 corresponding to the fifth standard surface 31a and the casing 31 and the supporting plate 27 are so arranged that the standard surfaces 31a and 27a contact each other. The slit 8 is defined in the supporting plate 27 corresponding to the light receiving element 7 (not shown in FIG. 14) so as to introduce the light beam from the light emitting element 6 to the light receiving element 7. A filter 30 is placed in front of the slit 8 so as to prevent entrance of the paper dust produced from the original document 15 to the light receiving element 7 through the slit 8. A double side adhesive tape 28 is attached to the upper surface of a bent portion 27b formed at the end portion of the supporting plate 27. One edge portion of the table glass 5 is secured to the bent portion 27b.

In the arrangement mentioned above, since the casing 31 for holding the light receiving element 7 and the supporting plate 27 are secured by contacting the fifth standard surface 31a and sixth standard surface 27a, alignment of the level of the light receiving element 7 against the slit 8 and the table glass 5 can be made easily with high accuracy. More specifically, the slit 8 and the original document platform 2 are aligned against the sixth standard surface 27a with the light receiving element 7 held corresponding to the fifth standard surface 31a, whereby the level adjustment of the respective parts can be made easily with high accuracy by only contact of the fifth standard surface 31a and the sixth standard surface 27a. In a case where the distance between the sixth standard surface 27a and the supporting plate 32 does not coincide with the size between the fifth standard surface 31*a* and the bottom of the resilient member 33, the difference of the size may be compensated by expansion or shrinking of the resilient member 33.

Figure 16:
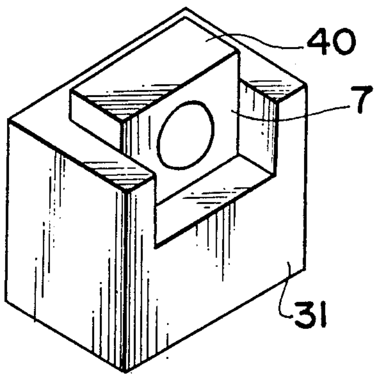
FIG. 16 is a perspective view showing another example of the positioning member in which the standard surface is formed above the photo transistor held by a holding block.

In place of forming the fifth standard surface 31*a* on the casing 31, there may be formed another fifth standard surface 40 on the top of the light receiving element 7 as shown in FIG. 16. In this case, the same technical effects mentioned above can be obtained.

In the positioning mechanism mentioned above, positioning of the light emitting element and light receiving element can be effected easily and the necessary working time can be decreased and the production cost may be decreased.

According to the present invention, since the signals representing the original document size can be obtained by reception or interruption of the detection light directed to the light receiving element, the S/N ratio of the detection signal is high and it is advantageous that a fine adjustment is unnecessary. Another advantage of the present invention is that a reliable original document size detecting arrangement can be manufactured with low cost.

It is a further advantage of the present invention that the light and shade of the original document does not affect the detection of the original size detection. In addition, since the size of the original document can be detected by the interruption of the light beam travelling in the direction of the surface of the document, it is possible to detect the size of a transparent document, such as film for an overhead projector. In addition, in the present invention, it is possible to detect the size of all kinds of original documents such as a thick book or the like, since the size can be detected even if the original document is partly raised from the original document platform.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A photocopy document sheet size detecting apparatus comprising:

a document sheet platform means having a generally planar flat plate for placing a document sheet substantially planar in a dimension perpendicular to the plane of said document sheet platform thereon;

at least one pair of the light emitting element and a light receiving element, said light emitting element disposed on a first side of said document sheet platform for transmitting detection light, along a surface of said document sheet platform spaced a predetermined value thereabove, to said light receiving element disposed on an opposite second side of said document sheet platform; and judgement means, coupled to said light receiving element, for determining if said light receiving element receives said detection light and for outputting a signal indicative of the document sheet size of a document sheet placed on said document sheet platform.

2. The photocopy document sheet size detecting apparatus according the claim 1, wherein said document sheet platform is generally rectangular with one peripheral edge formed as a standard for placing said document sheet and wherein a light axis between said light emitting element and said light receiving element is parallel to said one peripheral edge.

3. The photocopy document sheet size detecting apparatus according to claim 1, wherein said document sheet platform is generally rectangular with one peripheral edge formed as a standard for placing said document sheet and wherein a light axis between said light emitting element and said light receiving element is slanted against said one peripheral edge.

4. The photocopy document sheet size detecting apparatus according to claim 1, further comprising a plurality of pairs of a light emitting element and a light receiving element disposed about said document sheet platform in a manner similar to said at least one pair.

5. The photocopy document sheet size detecting apparatus according to claim 1, wherein said light emitting element and said light receiving element are disposed so that said detection light transmitted between said light emitting element and said light receiving element is spaced a predetermined value of 0.25 mm above said document sheet platform.

6. The photocopy document sheet size detecting apparatus according to claim 1, wherein said light emitting element and said light receiving element are respectively installed in casings placed on predetermined standard surfaces.

7. A photocopy document sheet size detecting apparatus comprising:

a document sheet platform having a generally planar flat plate of rectangular shape with one peripheral edge formed as a standard for placing a document sheet substantially planar in a dimension perpendicular to the plane of said document sheet platform thereon;

at least one pair of a light emitting element and a light receiving element, said light emitting element diposed on a first side of said document sheet platform for transmitting detection light, along a surface of said document sheet platform spaced a predetermined value thereabove, to said light receiving element disposed on an opposite second side of said document sheet platform at a position wherein a light axis of said detection light is slanted with respect to said one peripheral edge; and judgement means, coupled to said light receiving element, for determining if said light receiving element receives said detection light and for outputting a signal indicative of the document sheet size of a document sheet placed on said document sheet platform.

8. The photocopy document sheet size detecting apparatus according to claim 7, further comprising a plurality of pairs of a light emitting element and a light receiving element disposed about said document sheet platform in a manner similar to said at least one pair.

9. The photocopy document sheet size detecting apparatus according to claim 7, wherein said light emitting element and said light receiving element are disposed so that said detection light transmitted between said light emitting element and said light receiving element is spaced a predetermined value of 0.25 mm above said document sheet platform.

10. The photocopy document sheet size detecting apparatus according to claim 7, wherein said light emitting element and said light receiving element are respectively installed in casings placed on predetermined standard surfaces.

11. A method of detecting a photocopy document sheet size of a document sheet placed upon a document sheet platform having a planar flat plate of rectangular shape, said document sheet substantially planar in a dimension perpendicular to the plane of said document sheet platform, comprising the steps of:

transmitting detection light from a light emitting element disposed on a first side of said document sheet platform, along a surface of said document sheet platform and spaced a predetermined value thereabove, to a light receiving element disposed on an opposite second side of said document sheet platform;

determining whether said light receiving element receives said detection light; and developing an output signal based upon said determining indicative of the document sheet size of a document sheet placed on said document sheet platform.

12. A method of detecting a photocopy document sheet size of a document sheet placed upon a document sheet platform having a planar flat plate of rectangular shape with one peripheral edge formed as a standard, said document sheet substantially planar in a dimension perpendicular to the plane of said document sheet platform, comprising the steps of:

transmitting detection light from a light emitting element disposed on a first side of said document sheet platform, along a surface of said document sheet platform and spaced a predetermined value thereabove, to a light receiving element disposed on an opposite second side of said document sheet platform at a position wherein a light axis of said detection light is slanted with respect to said one peripheral edge;

determining whether said light receiving element receives said detection light; and developing an output signal based upon said determining indicative of the document sheet size of a document sheet placed on said document sheet platform.

* * * * *